Inventor.
Alexander Dow
By his Attorney
F. H. Gibbs

Sept. 10, 1929.  A. DOW  1,727,757
BRAKE MECHANISM
Original Filed June 25, 1925   4 Sheets-Sheet 3

Inventor
Alexander Dow
By his Attorney
F A Gibbs

Sept. 10, 1929.  A. DOW  1,727,757
BRAKE MECHANISM
Original Filed June 25, 1925  4 Sheets-Sheet 4
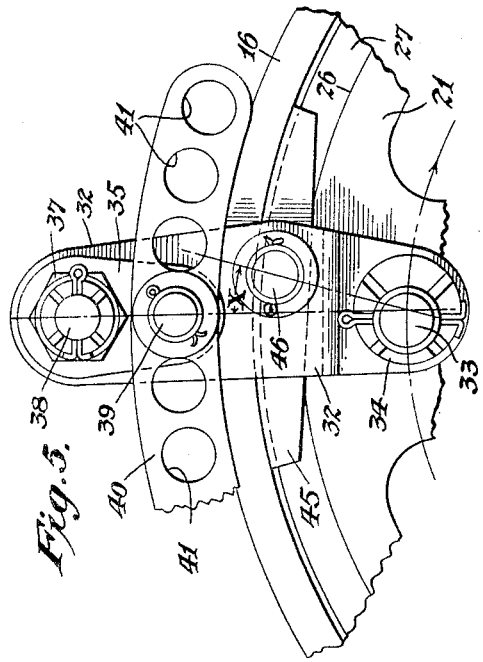
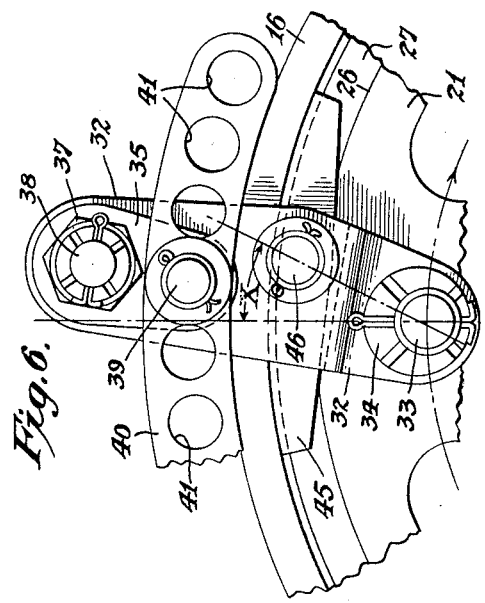
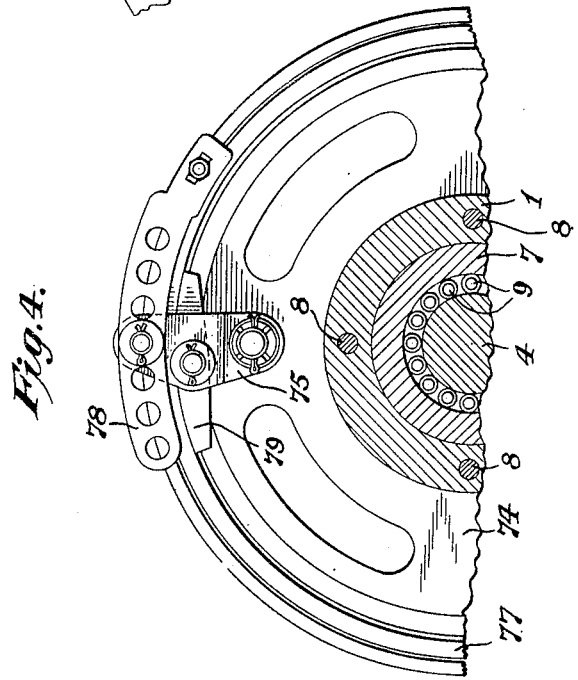
Inventor
Alexander Dow
By his Attorney Patented Sept. 10, 1929.

1,727,757

UNITED STATES PATENT OFFICE.

ALEXANDER DOW, OF NEW YORK, N. Y., ASSIGNOR TO DOW TRANSMISSION CORPORATION, OF NEW YORK, N. Y., A CORPORATION OF NEW YORK.

BRAKE MECHANISM.

Original application filed June 25, 1925, Serial No. 39,525. Divided and this application filed March 9, 1926. Serial No. 93,452.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 4 is a sectional view along the line 4—4 of Fig. 1, and

Figs. 5 and 6 are views on an enlarged scale of the coil pulling lever on the rotor in different positions.

Figure 1:
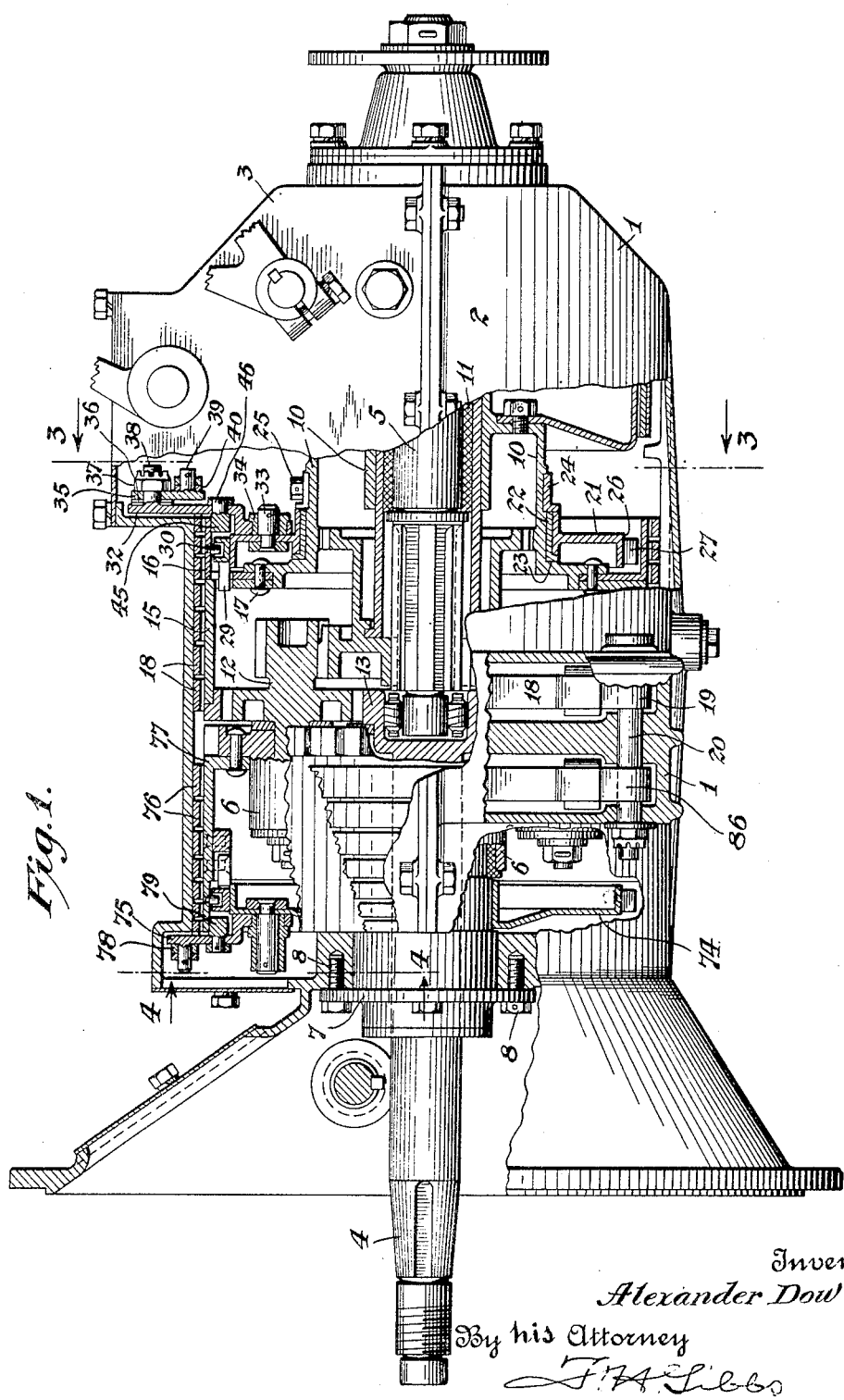
Figure 1 is a side elevational view of a power transmission mechanism with the outside casing thereof partially broken away to show certain parts in section and a brake mechanism constructed in accordance with the invention.

An object of the invention is to provide a brake mechanism that will automatically apply a braking action gradually and without sudden shock to a member upon rotative movement of such member in one direction and release the braking action on the member upon rotative movement thereof in a reverse direction.

Another object of the invention is to provide a coil brake mechanism not only for controlling the braking action on a rotative member in accordance with the direction of rotation of such member but to provide mechanism for adjusting and for limiting the braking action.

The brake mechanism disclosed in this application is shown applied to an automobile power transmission but it is not to be considered as limited for such service inasmuch as the brake features disclosed are applicable to other uses. This case is a division of my application Serial No. 39,525 filed June 25, 1925.

In the drawings only a portion of the automobile transmission disclosed in application, Serial No. 39,525, is shown to illustrate the invention. The power transmission comprises a casing 1 having a bottom section 2 and a top section or cover 3. A driving shaft 4, which is connected to a propelling motor (not shown) at one end thereof, is connected through speed changing epicyclic gearing to a driven shaft 5. The two shafts 4 and 5 are provided with suitable bearings in the casing 1. In the epicyclic gearing between the driving shaft 4 and the driven shaft 5 is a gear head 6 which is rotatably mounted on a bearing retainer 7. The retainer 7 is secured to the casing 1 by bolts 8, shown in Fig. 1 of the drawings, and carries roller bearings 9, shown in Fig. 4, which support the driving shaft 4. The gear head 6 is connected to a second speed rotor 10, which carries a bushing 11 on the driven shaft 5. Planetary gears 12, which are rotatably mounted on the gear head 6 mesh with a driving gear 13 secured to the driving shaft and with gearing on the second speed rotor 10. The above mentioned mechanism for connecting the driving shaft to the driven shaft is claimed and is more fully described in the applications referred to above. Accordingly a further description of the epicyclic gearing system is deemed unnecessary.

In the operation of the transmission system to rotate the driven shaft 5 at different speeds it is necessary to selectively apply a brake action to the gear head 6 and the second speed rotor 10. The means for applying a braking action to the gear head 6 and the means for applying a braking action to the second speed rotor are very similar in construction and accordingly only the braking means for controlling the second speed rotor will be described in detail.

Two flanged rims 15 and 16 are secured to the second speed rotor 10 by means of rivets 17. The two rims 15 and 16, which may be considered a part of the second speed rotor, are engaged by a coil brake 18 for controlling the epicyclic gearing. The coil brake is preferably a helical spring formed of flat tapering metal one end of which is securely anchored to the casing 1. In Fig. 1 of the drawings an eyelet 19 on the end of the coil brake 18 is shown secured to the casing 1 by means of an anchor or stud bolt 20. The number of convolutions of the brake 18 around the rims 15 and 16 depends upon the amount of braking action necessary to check the rotation of the second speed rotor. The brake coil is formed of such a diameter that its elasticity causes it to normally engage the interior of the casing 1 which is bored or shaped for such purpose. Thus, normally a clearance is provided beween the interior circumference of the brake coil and the outer circumferences of the flanged rims 15 and 16. Preferably a clearance of about $\frac{1}{32}$ of an inch is provided between the coil brake and the circumferences of the rims 15 and 16. The coil brake 18 is applied to the circumference of the rims 15 and 16 upon a rotative movement of the second speed rotor in a predetermined direction by mechanism to be described.

Figure 3:
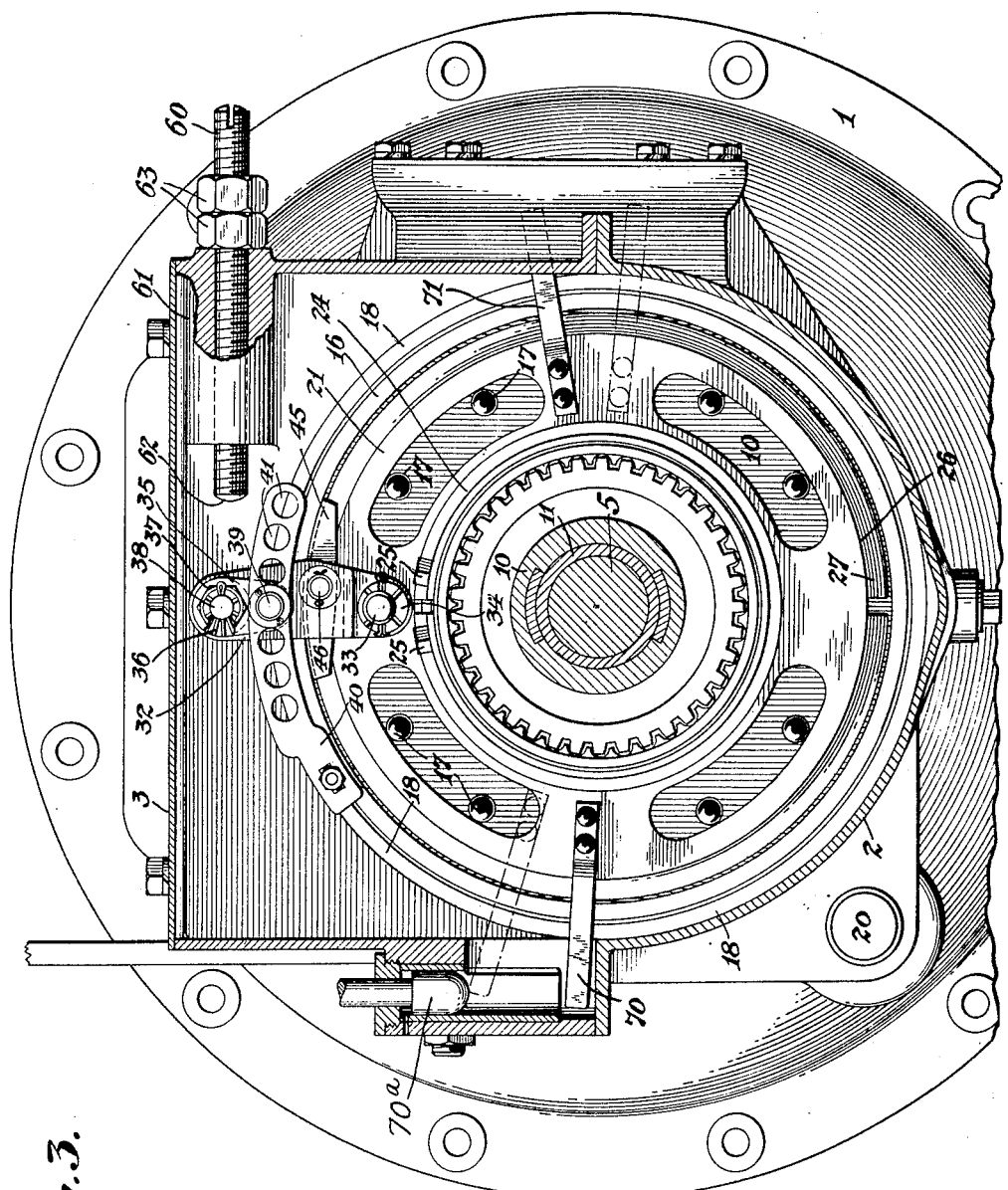
Fig. 3 is a sectional view along the line 3—3 of Fig. 1.

A pulley 21 is mounted to rock freely on a bushing 22 carried by the second speed rotor 10. Such pulley 21 is kept from lateral movement along the hub of the second speed rotor by a shoulder 23 on one side thereof and by a split ring 24 on the other side thereof. The split ring 24 is secured in a groove to the second speed rotor 10 by means of bolts 25, as shown in Fig. 3 of the drawings. The pulley 21 may be formed from suitable sheet metal or may be a light casting and is provided with a circumferential rim 26. A split ring 27 surrounds rim 26 for controlling the movements of the pulley 21 in accordance with the direction of rotation of the second speed rotor. The split ring 27 is provided with a lug 29 projecting into an orifice in the second speed rotor, as shown in Fig. 1 of the drawings, so that the split ring 27 partakes of any rotative movement of the rotor. The split ring 27 is held against lateral displacement on the pulley 21 by means of pins 30 riveted to the rim 16 of the second speed rotor and entering slots formed in the split ring.

Inasmuch as the split ring 27 is secured to the rotor 10, it is apparent the frictional engagement between the ring and the pulley compels the pulley to rock in accordance with the direction of rotation of the rotor. The frictional connection between the split ring 27 and the pulley 21 permits relative movement between the pulley and the ring when a braking action or a releasing action has been effected. It may be noted that when the split ring is rotated at a predetermined speed centrifugal force tends to hold the ring away from the pulley and thus remove the frictional engagement between the ring and the pulley.

The pulley 21, by mechanism to be described, engages the free end of the coil brake 18 for applying such brake to the rims 15 and 16 of the second speed rotor. A stud 33 carries an eccentric bushing 34 upon which is rotatably mounted a coil pulling lever 32. The eccentric bushing 34 is adjustable on the stud in order to change the center of rotation of the coil pulling lever on the pulley 21. A suitable cotter pin is provided for holding the bushing in any set position. A short lever 35, which is serrated to match similar serrations 36 on the coil pulling lever 32 is held in position by a castle nut 37 on a stud 38. The stud 38 is secured to one end of the coil pulling lever 32. By means of the serrated engagement between the short lever 35 and the coil pulling lever 32 a fine adjustment of the position of the short lever with respect to the coil pulling lever may be effected for adjusting the tension on the coil brake 18. A stud 39 projects from the end of the short lever 35 for engaging a connecting rod 40 secured to the end of the coil brake 18 as shown in Fig. 3 of the drawings. The coil brake 18 has an end portion 81 thereof bent at a right angle to the coil for engaging the connecting rod 40. A nut 82 is connected to the end portion 81 of the coil brake for holding it in engagement with the connecting rod. The connecting rod 40 is provided with a series of holes 41 therein for receiving the stud 39 on the short lever. Suitable means, such as a cotter pin, may be provided for holding the connecting rod in position on the stud 39. The adjustable connection of the rod 40 with the short lever 35 serves as a means for effecting a rough adjustment of the coil brake 18, a fine adjustment of the brake being effected, as above set forth, by adjusting the rotative position of the short lever 35 on the coil pulling lever 32.

A clamp block 45 is mounted to rock on a pivot 46 carried by the coil pulling lever 32. Such clamp block serves as a means for effecting firm clamping engagement between the pulley 21 and the rim 16 of the second speed rotor. The block 45 is shaped to fit the inside circumference of the rim 16 as best illustrated in Figs. 1, 3, 5 and 6 of the drawings. When the pulley 21 is rotated in a clockwise direction, as viewed in Fig. 3 of the drawing, for setting the coil brake 18, the clamp block 45 will tend to clamp the pulley 21 securely to the second speed rotor. However, when pulley 21 is given a movement of rotation in a counter-clockwise direction by the rotor the clamp block 45 is moved away from the inside circumference of the rim 16 on the rotor 10.

The clamp block is adjusted with respect to the rim 16 by means of the eccentric bushing 34. In Figs. 5 and 6 the eccentric bushing has been shown in two different positions to illustrate the adjustment of the clamp block. The operation of the eccentric bushing serves to vary the pull of the friction ring 27 to any extent, depending upon the angle X formed by a radial line through the coil pulling lever 32 and a line passing through the centers of rotation of the rim pulling lever 32 and the clamp block 45. In Fig. 5 of the drawings the eccentric bushing 34 is so rotated as to reduce the angle X considerably. In such position of the eccentric bushing, the clamp block effects clamping engagement with the rim 16 upon slight movement of the pulley in a clockwise direction as viewed in Fig. 5. In Fig. 6 of the drawing the eccentric bushing is shown turned to a position such that the angle X is enlarged considerably as compared with the angle X in Fig. 5. The change in the position of the eccentric bushing serves to provide clearance between the clamp block and rim 16 and to change the angle at which the operating forces are applied so as to require more movement of the pulley in a clockwise direction before clamping engagement is effected with the rim 16.

In the braking mechanism above described it will be noted rotation of the second speed rotor 10 in one direction, namely, in a clockwise direction, as viewed in Fig. 3 of the drawings, serves to give the pulley 21 movement or rotation in a clockwise direction. Such movement of the rotor is transferred to the pulley 21 by means of the split friction ring 27. The pulley 21 acting through the coil pulling lever 32 and the short lever 35 applies the coil brake 18 to the rims 15 and 16 of the second speed rotor. The clamping engagement effected by the clamp block 45 and the rim 16 serves to increase the amount of pull effected on the end of the coil brake.

An adjustable stop screw 60 is threadably secured to a boss 61 in position whereby the end 62 thereof is adapted to engage a member secured to the pulley 21. In the drawings the stop screw is shown in such position as to engage the coil pulling lever 32 for limiting the braking action effected by the coil brake. Suitable locking nuts 63 are provided for holding the stop screw in any set position.

Figure 2:
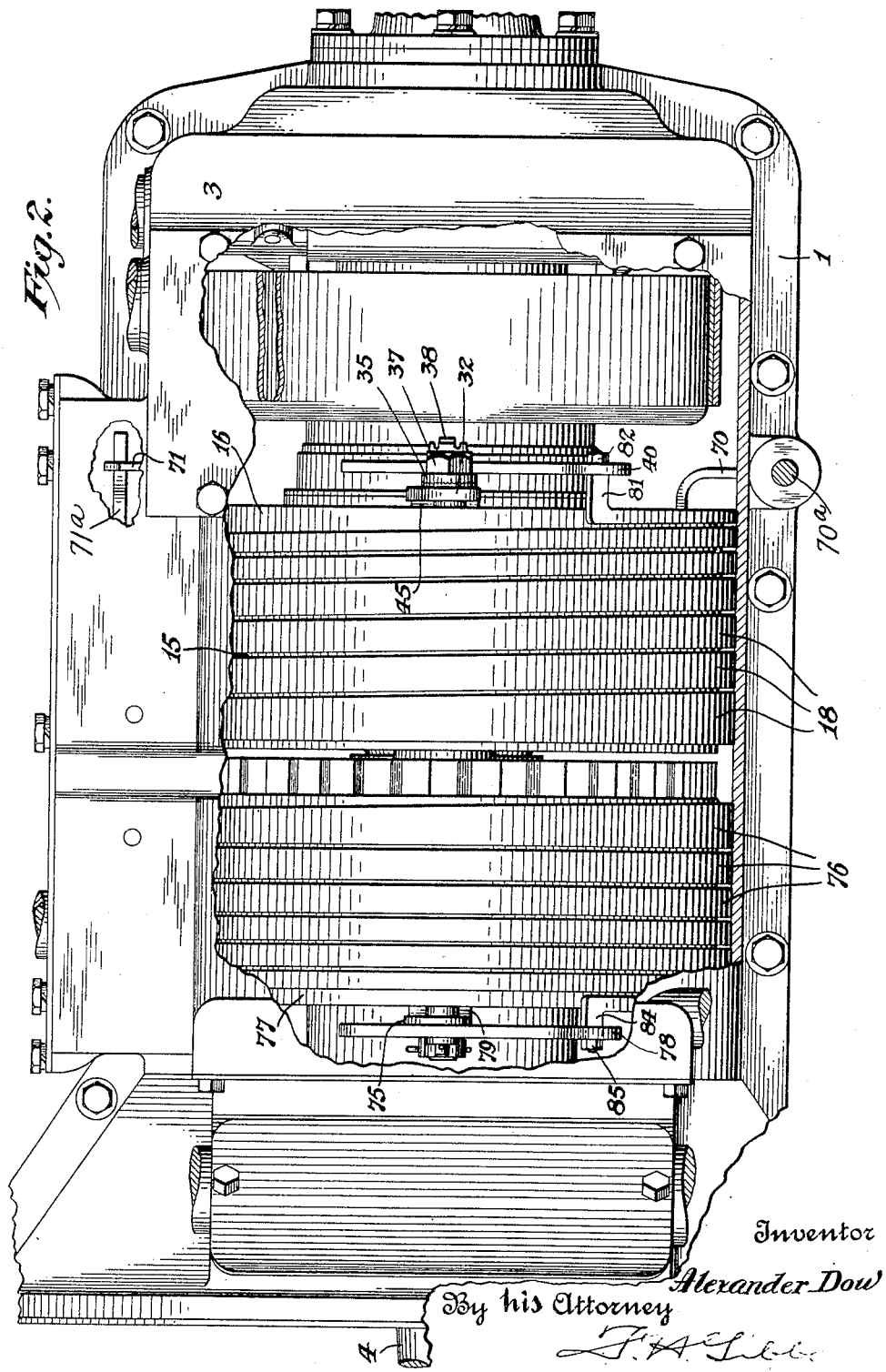
Fig. 2 is a plan view of the transmission mechanism shown in Fig. 1 having a portion of the casing cover broken away.

Arms 70 and 71 may be secured to the pulley 21 for holding the brake in a set position or for controlling the operation of the brake at will. If the arm 70 is forced downwardly, as viewed in Fig. 3 of the drawings, as by downward movement of the plunger 70ª upon it, or the arm 71 is forced upwardly,—as by upward movement of the member 71ª shown in Fig. 2,—then the pulley 21 will cause the coil brake 18 to press outwardly against the casing 1 and leave the second speed rotor 10 free to rotate without contact with it. Such operations of the plunger 70ª or of the member 71ª are alternative methods of arbitrarily controlling the action of the braking mechanism, and as such useful in its application to an automatic power transmission; however, they are not essential as to an understanding of my present invention, and hence need not be further described. In the automatic operation of the brake mechanism, it is apparent when the arms 70 and 71 are free to move, a clockwise rotation of the rotor and the pulley will set the brake and a counter clockwise rotation thereof will release the brake.

In the brake mechanism associated with the gear head 6, a friction pulley 74 similar in construction and operation to the friction pulley 21 is provided for operating a coil pulling lever 75 to set coil brake 76 on the circumference of a drum 77 secured to the gear head 6. In the brake mechanism for the gear head, the coil pulling lever 75 is directly connected to a connecting rod 78 similar to the connecting rod 40 heretofore described. The coil brake 76 has an end portion 84 thereof bent at a right angle to the coil for engaging the connecting rod 78. A nut 85 is connected to the end portion 84 of the coil brake for maintaining the connection between the coil brake and the connecting rod. The opposite end of the coil brake is connected to the anchor bolt 20 by means of an eyelet 86. It is unnecessary to provide a fine adjustment for the brake on the gear head as was necessary for the brake associated with the second speed rotor inasmuch as the gear head always rotates in the same direction and is only given a movement of rotation in a reverse direction sufficient to operate the brake mechanism. A clamp block 79 similar to the clamp block 45 heretofore described is provided for engaging the underside of the drum 77. The brake mechanism associated with the gear head and illustrated in Fig. 4 of the drawings operates in the same manner as the brake mechanism heretofore described and a further description thereof is deemed unnecessary.

I claim:

1. In a brake mechanism, a rotatable drum, braking means for engaging said drum to stop the rotation thereof, a brake controller for actuating said braking means when the drum is given a movement of rotation in one direction and for releasing said braking means when the drum is given a movement of rotation in a reverse direction and means rotating with said drum for operatively connecting said drum to said brake controller.

2. In a brake mechanism, a rotatable drum, braking means for engaging said drum to stop the rotation thereof, a brake controller for operating the braking means when the drum is given a movement of rotation in a predetermined direction and means rotating with said drum for operatively connecting said drum and brake controller.

3. In a brake mechanism, a rotatable drum, braking means for engaging said drum to stop the rotation thereof, a brake controller for controlling the braking means and means rotating with said drum and having frictional engagement with said brake controller for operating said controller in accordance with the direction of rotation of said drum.

4. In a brake mechanism, a rotatable drum, a coil brake for engaging said drum to stop the rotation thereof, a brake controller for setting said brake upon rotation of the drum in one direction and for releasing said brake upon rotation of the drum in a reverse direction and a ring rotating with said drum and operatively connecting said drum and brake controller.

5. In a brake mechanism, a rotatable drum, a coil brake for engaging said drum to stop the rotation thereof, a controlling device for governing the operation of the coil brake, and a split ring driven by said drum for operating said controlling device to set the brake when the drum is rotated in one direction and for operating said controlling device to release the brake when the drum is rotated in a reverse direction.

6. In a brake mechanism, a rotatable drum, a coil brake surrounding said drum and having one end thereof anchored beside the drum, a controller rotatably mounted on said drum and connected to the opposite end of said coil brake, and a split ring rotated by said drum and engaging said controller at low speeds and disengaging the controller at higher speeds, said ring operating the controller to set the brake when the drum is rotated in a predetermined direction.

7. In a brake mechanism, a rotatable drum, a pulley member rotatably mounted on said drum, a frictional connection between the drum and the pulley member for giving the pulley member a movement of rotation in accordance with the rotation of the drum, a coil brake for stopping rotation of said drum, and an adjustable connection between the brake and said pulley for operating the brake according to the direction of rotation of the drum.

8. In a brake mechanism, a rotatable drum, a brake for engaging said drum, a rotatable control member for said brake having a yielding actuating connection with said drum for setting said brake upon rotation of the drum in a predetermined direction and a stop for limiting the rotative movement of the control member in one direction to limit the setting of the brake.

9. In a brake mechanism, a rotatable drum, a rotatable pulley having a yielding actuating connection with said drum, a control lever mounted on said pulley, a brake for engaging said drum, an adjustable operative connection between said lever and the brake for setting and releasing the brake according to the direction of rotation of the pulley, and a stop for limiting the rotative movement of the pulley in one direction to limit the setting of the brake.

10. In a brake mechanism, a rotatable drum, a rotatable pulley having a yielding connection with said drum, a control lever having a pivotal adjustment on said pulley, a coil brake for stopping rotation of said drum, and adjustable connecting means between said lever and the brake for setting and releasing the brake.

11. In a brake mechanism, a rotatable drum, a rotatable pulley having a frictional connection with said drum, a control lever mounted on the pulley, a connecting rod having an adjustable pivotal connection with said control lever, a coil brake connected to said connecting rod and a block for engaging said drum carried by said lever.

12. In a brake mechanism, a drum, a rotatable pulley having a fractional connection with said drum, a lever having an adjustable eccentric mounting on said pulley, a block member pivotally mounted on said lever for engaging the drum upon movement of the pulley in one direction, said eccentric mounting on the pulley being adjusted to vary the clamping action between said block and the drum, and a brake operated in accordance with the movement of said lever.

13. In a brake mechanism, a drum, a rotatable control member having a frictional connection with said drum, means for effecting a firm clamping engagement between the drum and the control member upon rotation of the drum in a predetermined direction, and a brake for said drum operated by said control member when rotated in a predetermined direction.

14. In a brake mechanism, a rotatable drum, a coil brake surrounding said drum, a pulley member rotatably mounted on said drum, a ring member rotated with said drum and frictionally engaging said pulley member, a lever mounted on the pulley member, and a clamp block pivotally mounted on said lever for effecting a firm engagement with the drum when the pulley is rotated in one direction and for separating from the drum when the pulley member is rotated in a reverse direction, one end of said coil brake being connected to the lever for setting the brake when the pulley member is rotated in a predetermined direction.

15. In a brake mechanism, a rotatable drum, a coil brake for engaging the drum to stop the rotation thereof, a controlling device for governing the operation of the coil brake, a split ring engaging the controlling device and driven by said drum for operating said controlling device to set the brake when the drum is rotated in one direction, and means for limiting the opening of the split ring when the drum is rotated above a predetermined speed.

16. In a brake mechanism, a rotatable drum, a coil brake for engaging said drum to stop the rotation thereof, means comprising a pulley for controlling the operation of the coil brake, and a split ring mounted on said pulley and operated by the drum for controlling said pulley, said ring being held away from the pulley by centrifugal force when the drum is rotated above a predetermined speed.

17. In a brake mechanism, a rotatable drum, a coil brake for engaging said drum to stop the rotation thereof, means comprising a rockable pulley for controlling said brake in accordance with direction of rotation of the drum, and means for manually controlling said pulley to control said brake at will.

In witness whereof I have hereunto set my hand.

ALEXANDER DOW.